FIG. 2b.

United States Patent Office 3,767,609
Patented Oct. 23, 1973

3,767,609
PROCESS FOR THE SALT-FREE MANUFACTURE OF ARTICLES FROM LINEAR AROMATIC POLYAMIDES IN A LACTAM SOLVENT
Rudolf Gabler, Uitikon-Waldegg, Josef Studinka, Zurich, and Heinz Lussi and Clau Berther, Chur, Grisons, Switzerland, assignors to Inventa AG fur Forschung und Patentverwertung Zurich, Zurich, Switzerland
Filed Jan. 26, 1972, Ser. No. 220,898
Claims priority, application Switzerland, Feb. 9, 1971, 1,868/71
Int. Cl. C08g 51/44
U.S. Cl. 260—30.2                                                   13 Claims

ABSTRACT OF THE DISCLOSURE

An improved process for the preparation of shaped articles wherein a polyamide is formed by the polycondensation of a corresponding diamine and a corresponding acid chloride in a solvent. The solvent having the formula:

$$\begin{array}{c} C=O \\ | \diagdown \\ R-N-[CH_2]_n \end{array}$$

whrein R is an alkyl radical having 1–4 carbon atoms and $n$ is a whole number between 5 and 7.

---

The present invention concerns articles, like fibres, foils, strips or coatings of linear aromatic polyamides, a process for their manufacture in the absence of inorganic salts, and the solution of the aromatic polyamides used for their production.

Fibres, foils, coatings and other endless articles of linear high molecular polyamides which predominantly contain m-phenylene-isophthalamide units are of important technical interest on acount of their high melting point of above 300° C., their heat resistance, non-inflammability and their good mechanical, chemical and electrical properties.

Since the high melting point of such aromatic polyamides renders it impossible to work them up from the melt, the production of fibres, foils and other endless articles takes place only from a solvent, preferably organic. Actually speaking, because of the selective solubility of the unsubstituted aromatic polyamides only a limited number of solvents are used. Thus, e.g. in U.S. Pat. No. 2,989,495 primary and secondary amines were proposed; in U.S. Pat. No. 3,063,966 (p. 2, lines 37–42) N-alkylated acid amides like e.g. dimethylacetamide, tetramethylurea, N-acetylpyrrolidone, N-methylpyrrolidone and phosphoric acid tri(dimethylamide).

Practical experience has shown that in these solvents, only those aromatic polyamides of high molecular weight can be dissolved in high concentration, without the use of further additives, which are substituted either on the nitrogen atom of the amide group or on the aromatic rings. In the absence of such substituents, as e.g. with poly-m-phenyleneisophthalamide, the solvent power of the amines and amides is insufficient to produce sufficiently concentrated solutions which are adequately stable at the required working temperatures and durations.

As is known from the above mentioned U.S. Pat. No. 2,989,495 and U.S. Pat. No. 3,068,188, the concentration and stability of aromatic unsubstituted polyamides in solvents based on amines or amides can be very effectively improved by addition of halide ions in the form of hydrogen halide or of halogen salts soluble in these solvents of alkali or alkaline earth metals, e.g. lithium chloride or calcium chloride.

The use of such solvent auxiliaries has, however, quite considerable disadvantages in the commercial working up process. Thus, the presence of hydrogen halide in solvents based on amines, on spinning or casting of polyamide solutions, leads to strong corrosion of the spinning nozzles or casting apparatus. With the use of the above mentioned halides in association with solvents based on amides it is true that the corrosion problem is less pronounced, but it is nevertheless, still present. The main disadvantage lies however in that the salts which must be used in concentrations of 10–50% based on the polymer, can only be removed from the formed polyamide articles with difficulty.

In U.S. Pat. No. 3,360,598 these disadvantages are expressly mentioned, particularly the fact that the retention of a fraction of a percent of salt in the formed article strongly reduces the heat resistance of the polyamide. It has therefore been proposed to carry out the working up of the polyamide at unusually high temperatures near the boiling point of the solvent. Even this is not a favorable solution, since the working up of a polyamide solution in the vicinity of the boiling point of the solvent is hardly possible technically.

Further disadvantages on working with solvents containing salts occur in the working up of the coagulating and washing baths, from which the necessary recovery of the solvent is made much more difficult by the presence of inorganic salts. Finally the salts themselves either require a further recovery plant, or in view of the quantities used, they produce a troublesome waste water problem. It is therefore most desirable to find a solvent in which the aromatic polyamide as defined above can be dissolved in the absence of salts or acids to form concentrated, highly viscous, stable solutions from which they can be made into fibres, foils, coatings and other endless articles of high value.

It has now been found that articles like fibres, foils, strips or coatings can be made in a salt-free manner from solutions of aromatic polyamides which consist of at least 50 molar percent of linear aromatic polyamides with repeating structural units of the formula:

and with a reduced specific viscosity (RSV) of at least 1.0 (0.2 g. of polymerisate in 100 ml. of concentrated sulphuric acid at 20° C.), if as solvent for these polyamides an N-alkyl lactam of the formula:

Formula I is used, wherein R is an alkyl radical with 1–4 carbon atoms; $n$ is a whole number between 5 and 7; and the hydrogen atoms of the methylene groups may be wholly or partly replaced by alkyl groups with 1–4 carbon atoms ("salt-free" means in the absence of salts which dissolve in the solvents to be used).

The preferred solvent for the aromatic polyamides in accordance with the definition is N-methylcaprolactam and N-ethyl-3,3,5-trimethyl-caprolactam. Other members of this class of solvents are N-isobutyl-, N-tert.butyl-, N-methyl-4-methylcaprolactam, N - methyloenantholactam, or N-methylcapryl lactam. In addition, mixtures of these lactams can be used, as well as mixtures of isomers such as are formed by Beckmann transformation of unsymmetrically substituted C-alkylated cyclohexanone-, cycloheptanone-, and cyclooctanone-oximes.

The preferred polyamide to which the process of the invention may be applied is poly-m-phenylene-isophthalamide. Other co-polyamides can also be used which contain up to 50 mol percent of units derived from p-phenyleneisophthalamide, m-phenyleneterephthalamide, p-phenyleneterephthalamide, m-phenylene - 5 methylisophthalamide, hexamethyleneterephthalamide, hexamethyleneisophthalamide, tetramethyleneisophthalamide, dodecamethyleneterephthalamide, or m-phenylene - 2,5 - dichloroterephthalamide, in the molecule.

Polymers of two such units together with at least 50 mol percent of poly-m-phenyleneisophthalamide may form valuable terpolymers.

The production of solutions, capable of being spun and cast, and containing at least 50 mol percent of m-phenyleneisophthalimide units preferably takes place by direct polycondensation of the corresponding diamines with the corresponding acid dihalides, particularly acid dichlorides in the solvent of Formula I, without isolation of the solid polyamide formed. However, one can dissolve the solid polyamide obtained in a different way, e.g. by boundary surface polycondensation, in a solvent in accordance with the invention at 50-150° C. in the absence of salts, and finally spin or cast.

For technical spinning and casting processes of polyamides in accordance with the definition, a solution of the aromatic polyamides as defined made by direct polycondensation of diamines and acid chlorides can be used since in this way it is easier to reach high polyamide concentrations.

Both the previously known solvents, dimethylacetamide and N-methylpyrrolidone, and the solvents of Formula I used in accordance with the invention have the ability to combine the hydrogen chloride formed in the polycondensation of the corresponding diamide with the acid chloride. A disturbing side reaction may take place, however, in that a part of the acid dichloride reacts with the solvent, spitting off chloride ions before it can react with the diamine. This solvent destruction of the acyl halides is described by H. K. Hall, Jr., Journal of Am. Chem. Soc., 78, 2717 et seq. (1956).

Figure 1:
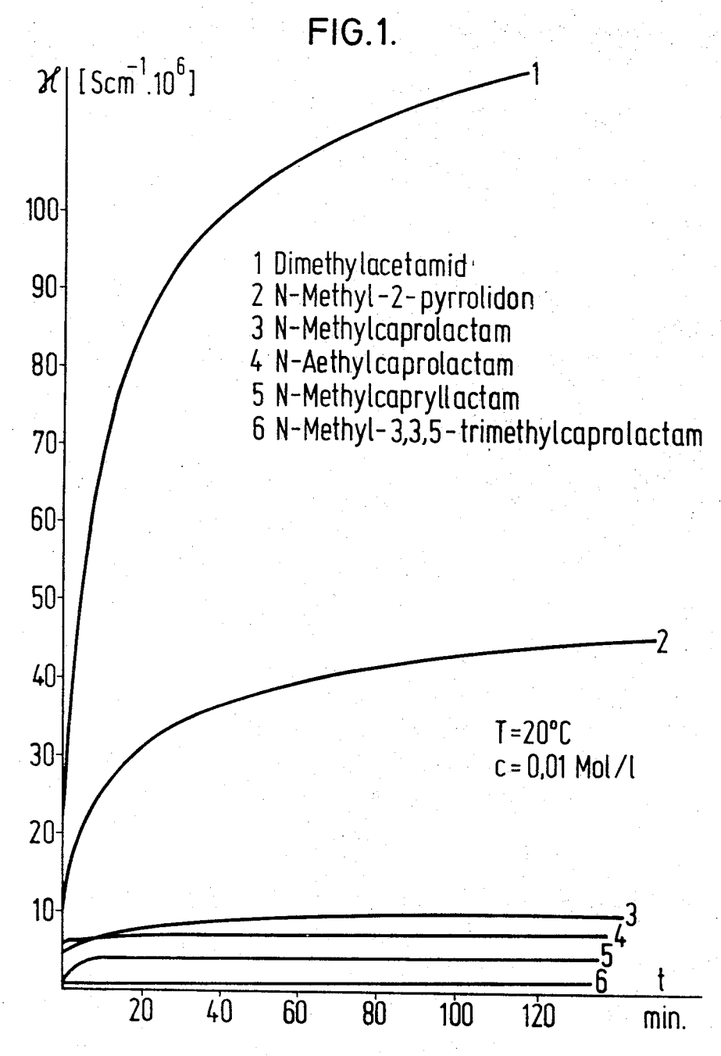

Comparative conductivity experiments with isophthaloylchloride in N-methylcaprolactam (according to the present invention, Formula I) on the one hand and in dimethylacetamide and in N-methylpyrrolidone (previously known) on the other hand clearly show (FIG. 1) a lower tendency to splitting off of chloride ions in N-methylcaprolactam than in the other named solvents and, connected with this, an importantly smaller tendency to the above mentioned side reaction. This remarkable stabiilty of the acid dichloride in the solvent of Formula I, to be used according to the invention, makes possible a better controllable or better reproducible polycondensation of the reaction components than is possible with previous solvents.

It has now been shown that previously only a single solvent, namely dimethylacetamide could be successfully used for the polycondensation of acid chloride and diamine to the aromatic polyamide in accordance with the definition. With dimethyl formamide for example even at low temperatures the side reaction cannot be suppressed so that only polyamide of low molecular weight can be obtained (Savinov et al., Vysokmolekularnije Sojedinjenija, 7(5), p. 772 (1965).

With the use of N-pyrrolidone on the other hand a solid gel is formed between −3° C. and +17° C., which cannot be stirred and which in itself is a great disadvantage in a technical process. This again makes difficult the production of homogenous and high molecular polycondensates.

Even the dimethylacetamide previously preferred solvent is not satisfactory in every respect. At the required low starting temperature of −30° C. the solvent containing diamine solidifies to a rigid mass which cannot be rendered homogenous by stirring. If the solid aromatic dichloride is added to it, a very strongly exothermic reaction takes place spontaneously which with larger charges in the absence of homogenous mixing may lead to overheating, whereby the above mentioned side reaction sets in. It is therefore difficult to obtain high molecular weights with large quantities. Likewise difficult is the dissipation of the reaction heat suddenly released in the polycondensation on a technical scale. The main disadvantage of the use of dimethylacetmide as solvent lies however in the fact that polyamides which contain at least 50 mol percent of poly-m-phenyleneisophthalamide units, in the absence of inorganic salts are not stable even at room temperature. Such solutions tend to become cloudy and to gel even after a short time. The addition of inorganic salt is therefore a necessary precaution when using this solvent, although the disadvantages previously mentioned must be taken into account. Surprisingly it has now been found that by the use of N-alkyl lactams of Formula I as solvents, none of the said disadvantages arise. The advantages of the invention are particularly valuable when carrying out the process on a commercial or semi-commercial scale.

Figure 2A:
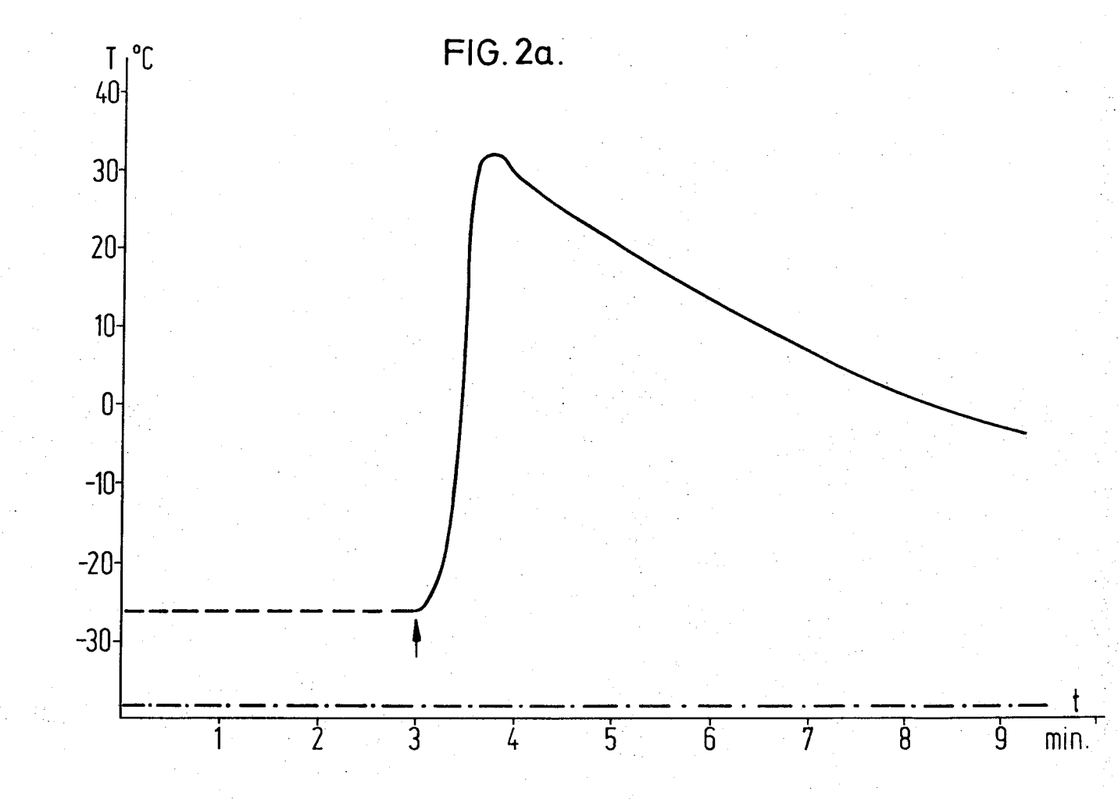
Figure 2B:
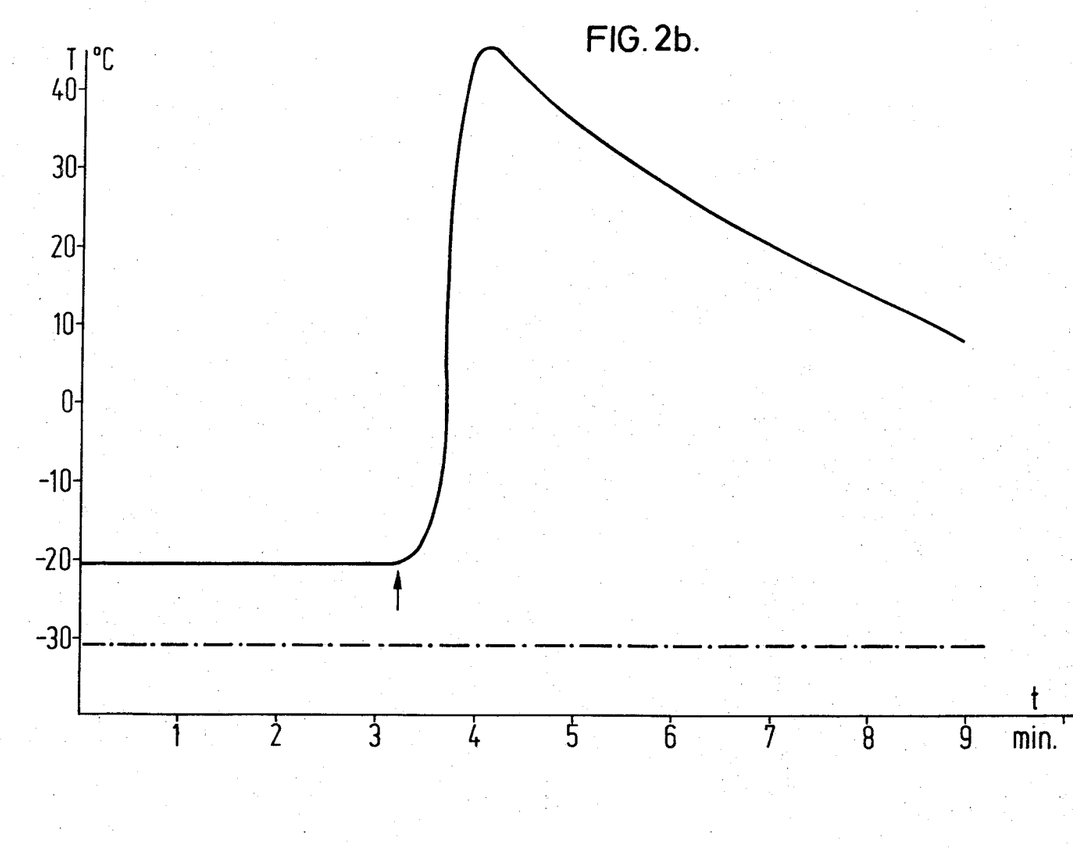
Figure 2C:
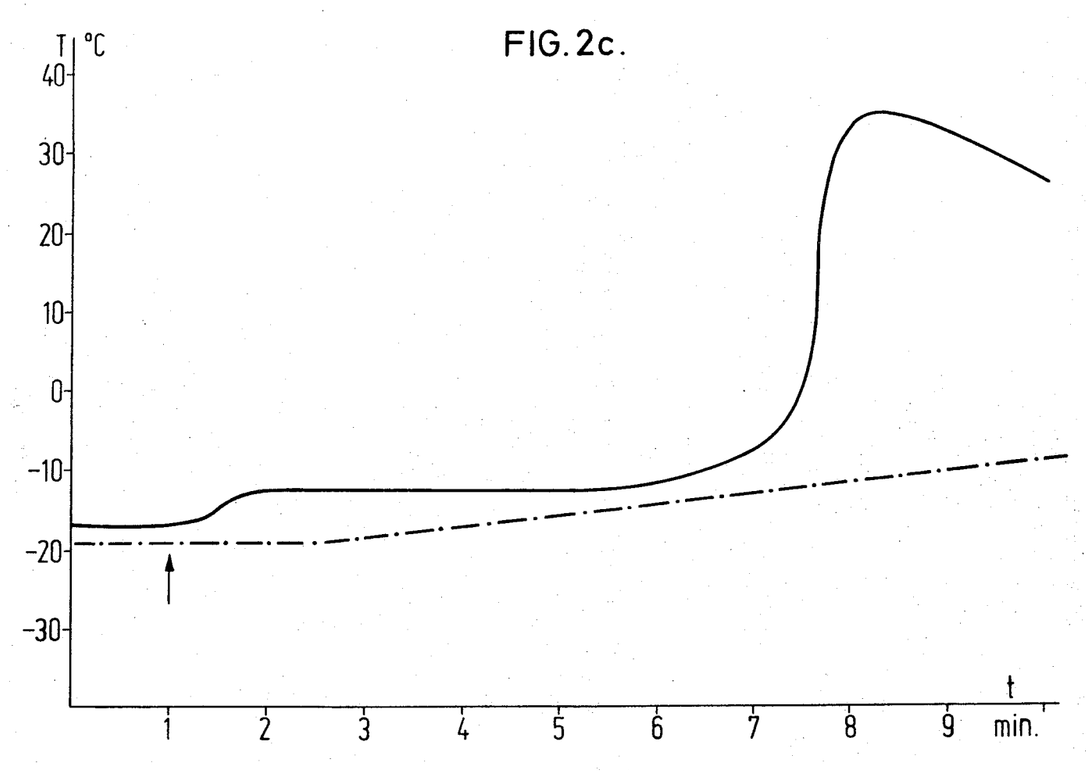

In FIGS. 2a–c these advantages are shown in more detail. The three curves FIGS. 2a, b and c show the time-temperature diagrams of three comparative experiments using the same starting materials, each with ½ mol of m-phenylene diamine and isophthaloyl chloride in the same concentration using the same apparatus whilst varying only the solvent. The time at which the (solid) isophthaloyl chloride is added is marked by an arrow. The broken line temperature curve indicated that stirring cannot be done in this phase. The cooling bath temperature is shown by the chain lines.

With the use of dimethylacetamide (known process) (FIG. 2, curve a) the starting solution solidifies at −26° C. and cannot be stirred. On the addition of solid isophthaloyl chloride a strongly exothermic reaction follows immediately so that the temperature rises to about 60° C. within 40 seconds. This rise cannot be prevented despite a low cooling bath temperature of −38° C. The reduced specific viscosity (RSV) of the polymer so formed amounted in this case to 1.54, measured as 0.2 g. of polymer in 100 ml. of concentrated sulphuric acid at 20° C. and calculated according to the formula:

$$RSV = \frac{\eta_{rel.} - 1}{C}$$

With the likewise known use of N-methylpyrrolidone as solvent (FIG. 2, curve b), the starting material can be stirred at −20.5° C. Upon the addition of solid isophthaloyl chloride an even stronger exothermic reaction occurs immediately (FIG. 2, curve a) and a temperature rise to about 65.5° C. within 60 seconds cannot be prevented despite a low cooling bath temperature of −31° C. On further cooling the contents of the flask solidify at about −3° C. to a hard gel, which can no longer be stirred. The gel liquefies at +17 to 18° C. so that the reaction can only be complete above this temperature. At this temperature there is obtained a polycondensate with an RSV of 1.63.

The course of the polycondensation in N-methylcaprolactam, one of the preferred solvents set forth in this application (FIG. 2 curve c), is quite different. Since no reaction between m-phenyldiamine and isophthaloyl choride can be observed between −30° C. and −8° C., a higher starting temperature, e.g. −15° C. may be used. At this temperature no reaction takes place, so that the whole quantity of acid chloride can be added and uniformly mixed. If now the mixture is slowly warmed whilst stirring, the polycondensation begins at −8° C. with evolution of heat and a temperature rise of only 43° C. occurs within 90 seconds, despite a higher bath temperature of −15° C. at the beginning of the reaction to −10° C. at the end (RSV=2.23). The N-methylcaprolactam acts as a moderator for the polycondensation reaction which is very violent in the previously proposed solvents. Relatively, the same effect is observed with other representative solvents of Formula I, e.g. with N-ethylcaprolactam, N-methyl - 4 - methylcaprolactam and N-methyl - 3,3,5-trimethylcaprolactam. Since, with the N-alkylcaprolactams of Formula I the disturbing side reaction between solvent and aromatic acid dichloride only takes place to a small extent, the polycondensation may be carried out in the temperature range between —5° C. and +25° C. The preferred temperature range is —15° C. to 0° C.

In the solvents in accordance with the invention the polycondensation mixture may be stirred from beginning to end. This advantage and the further fact that the aromatic acid dichlorides are more stable than in dimethylacetamide or N-methylpyrrolidone make it possible to produce polyamides with far higher molecular weights and more reproducibility than with known processes. If one takes the RSV as a measure of the molecular weight of the polycondensates obtained, with the use of N-alkyl lactams of Formula I, values of 2.5 to 3.0 are obtained with ease, whilst with the use of dimethylacetamide or N-methylpyrrolidone, as is apparent from the above, values above 2.0 are reached only with difficulty.

Figure 3:
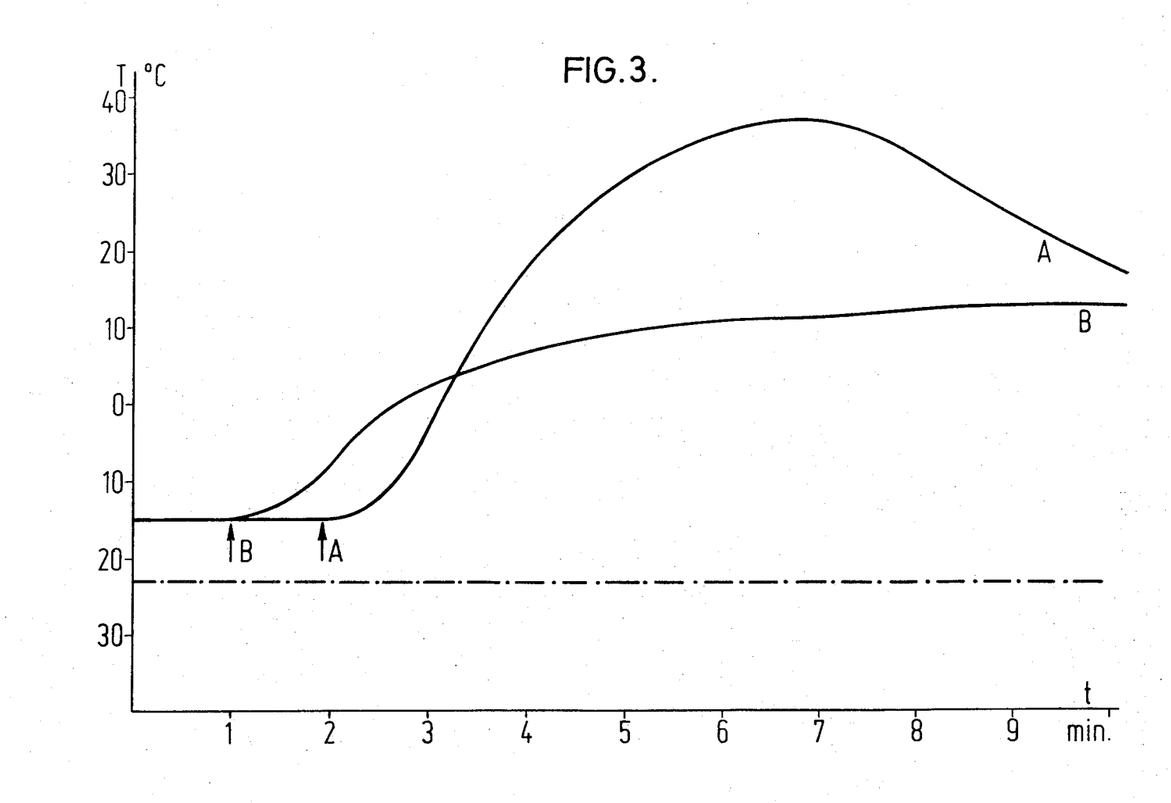

The high stability explained above of acid dichlorides in solvents of Formula I (compare FIG. 1) makes it possible to carry out the polycondensation commercially with particular elegance. The reaction components diamine and acid dichloride are separately dissolved in the solvent, particularly N-methylcaprolactam and the solution of one component is permitted to flow or fall in drops into the previously prepared solution of the other component. This variant of the manufacture of solutions of the aromatic polyamides as defined above in solvents of Formula I makes it possible advantageously to control the heat of reaction by corresponding regulation of the flow of the solution of one of the components, and moreover makes possible continuous working (compare FIG. 3). Furthermore this variant by alternating addition of diamine solution or acid dichloride solution makes it possible to produce block co-polymers, which is not possible with the known processes.

A further advantage of the use, in accordance with the invention, of solvents of Formula I becomes apparent when the polycondensation solution is freed from the hydrogen chloride formed during the reaction, which is preferably effected by introduction of gaseous ammonia and filtering off the ammonium chloride formed which is insoluble in the solvents of Formula I. In the case of the known use of dimethylacetamide and N-methylpyrrolidone (Examples 1 and 2) cloudy solutions are easily formed.

On standing at room temperature the clouding thickens and leads finally to a semi-solid gel. Such solutions cannot be used for spinning high tenacity fibres or for casting clear films or good electrical properties. Clean, stable solutions of aromatic polyamides could previously only be produced in dimethylacetamide or N-methylpyrrolidone by addition of inorganic salts soluble in these solvents during or after the polycondensation, which leads to the disadvantages previously mentioned.

In contrast to this the solution of aromatic polyamide in accordance with the definition in N-methylcaprolactam (Example 3) is absolutely clear after filtration and remains unchanged after many weeks standing. The differing stability of the three comparative solutions was ascertained by measurements of light transmission in a Lumetron colorimeter Type 402E in a layer thickness of 19 mm. and is shown in Table 1. Solutions of aromatic polyamide as defined in the N-alkyl lactams to be used according to the invention of Formula I can be heated for a short period (a few hours) up to 120° C. without separation of solid particles being observed. Such salt-free solutions contain the polyamide of high molecular weight (RSV=2.5 to 3.0) in high concentration (10–25% by weight) and reach dynamic viscosities of 500–7000 poises, and are outstandingly suitable for spinning fibres, coating wires, casting foils and bands, and also for coating paper, foils of artificial materials or fibrous webs according to known processes.

The spinning of solutions of aromatic polyamides in solvents of the Formula I can take place e.g. by the wet spinning process, in which as a precipitation bath a mixture of the same solvent as was used for the polycondensation and water is preferably used.

However, aqueous solutions of inorganic salts like e.g. calcium rhodanide can be used as a coagulation medium.

In spite of the comparatively high boiling point of the solvent of Formula I proposed herein, the polyamide solutions used in accordance with the invention are suitable for dry spinning in a hot atmosphere of air or inert gas. In this process a further advantage of the solvents according to the invention arises; they are essentially more stable at elevated temperature even in the presence of airborne acid, and have less tendency to discolor than dimethylacetamide and N-methylpyrrolidone.

The articles made according to the present process show outstanding mechanical, electrical and thermal properties. Fibres produced in accordance with the invention show tenacities between 4 and 6 g./den., and initial moduli of 80–150 g./den. The process of manufacture of the spinning or casting solutions used for this is essentially improved over the prior art since the polycondensation process requires less cooling energy because no solid phases arise as intermediates, and in consequence of lower heat evolution the process can be carried out without danger even with large loads. This holds true particularly for the above-mentioned kind of operation with the use of separate solutions for the reaction components diamine and acid chloride. Furthermore the addition of inorganic salts to stabilize the solution is unnecessary. Since such salts are not present, even in traces in the end products, these products show better thermal stabiliy and higher values for electrical breakdown resistance.

The following examples are illustrative of the invention. They are not meant to be limiting in any way.

EXAMPLE 1

(Comparative example borrowed from U.S. Pat. No. 3,063,966, Example 14)

Apparatus.—The polycondensation is carried out in a cylindrical 1 litre multi-necked flask with flat ground surfaces. The flask is provided with a stainless steel stirrer and a nitrogen inlet tube. The internal temperature is measured with a thermocouple, type Philips Thermocoax 2 ABAC 10 and recorded with a compensation recorder type Texas Instrument Servoriter PWS. For the cooling bath an ultracryostat model Lauda UK40 whose bath temperature is measured with a second thermocouple of the above type and recorded with an automatic compensation recorder Model Philips PR2210 A/21.

Process.—54.07 g. (0.50 mol) of m-phenylenediamine are placed in the flask explained above and dissolved under a nitrogen atmosphere with slow stirring in 550 g. of anhydrous dimethylacetamide at room temperature. The flask is then lowered into the cooling bath whose temperature is controlled at —38° C. After expiration of 60 minutes the internal temperature amounts to —28° C. and the diamine solution begins to crystallize. After a further 3 minutes the contents of the flask have solidified and can no longer be stirred (see FIG. 2a, broken line showing the internal temperature). Then 101.515 g. (0.50 mol) of solid isophthalic acid dichloride is introduced in one portion and wetted with 77 g. of dimethylacetamide. The strongly exothermic polycondensation reaction takes place instantaneously, the mixture becomes stirrable and the internal temperature rises within 40 seconds from —28° C. to +32° C. After expiration of 20 minutes the bath temperature is raised to 0° C. and the condensation mixture further stirred. The neutralization of the hydrochloric acid formed takes place by introduction of gaseous ammonia whilst cooling so that the internal temperature does not rise above 20° C. The ammonium chloride separation is removed by pressure filtration at room temperature. The filtered solution obtained contains 16% by weight of poly-m-phenyleneisophthalamide. A small test portion is precipitated in water, freed from residual solvent by boiling with water and dried. The RSV (reduced specific viscosity) of the test portion amounts to 1.54.

The polymer solution becomes cloudy on standing at room temperature with the separation of finely divided solid polyamide and shows after 3 days a reduction in light transmission of about 10% of the initial value (measured in 19 mm. layer thickness in a Lumetron colorimeter Type 402E).

EXAMPLE 2

(Comparative example)

For the polycondensation the apparatus described in Example 1 is used.

54.07 g. (0.50 mol) of m-phenylenediamine are dissolved under a nitrogen atmosphere with a slow stirring in 550 g. of anhydrous N-methylpyrrolidone at room temperature. The flask is lowered into the cooling bath whose temperature is controlled at −31° C. After about 60 minutes the internal temperature amounts to −20.5° C. The solution is clear and stirrable. Then 101.515 g. (0.50 mol) of solid isophthalic acid dichloride is added at once and wetted with 77 g. of N-methylpyrrolidone. The strongly exothermic polycondensation reaction takes place instantaneously, the internal temperature rises within 60 seconds to +45° C. (see FIG. 2b). After 25 minutes the bath temperature is raised to 0° C. 34 minutes after addition of the isophthalic acid dichloride, gelling takes place within a few seconds and the mixture is no longer stirrable. On further raising the bath temperature and on attainment of an internal temperature of +17° C. there is again formed a fairly viscous and stirrable solution. The neutralization and pressure filtration of the solution takes place in the way described in Example 1. A test portion of the 16% by weight solution is precipitated in water, washed and dried. The RSV of the poly-m-phenyleneisophthalamide amounts to 1.63.

The polymer solution becomes cloudy on standing at room temperature and shows after 24 hours a decrease in light transmission of about 10% of the initial value. After 10 days the solution has completely crystallized and no longer transmits light.

EXAMPLE 3

For the polycondensation the apparatus described in Example 1 is used.

54.07 g. (0.50 mol) of m-phenylenediamine is introduced into the flask and dissolved in 550 g. of anhydrous N-methylcaprolactam under a nitrogen atmosphere with slow stirring at room temperature. The flask is lowered into the cooling bath whose temperature is controlled at −19° C. After about 45 minutes the internal temperature amounts to −17° C. The solution at this temperature is clear and readily stirrable. 101.515 g. (0.50 mol) of solid isophthalic acid dichloride is added in one portion and wetted with 77 g. of N-methylcaprolactam. The internal temperature rises to −12.5° C. because of the addition of warmer components but remains constant at this value. The isophthalic acid dichloride is evenly distributed in the reaction mixture by stirring but remains for the greater part undissolved at this temperature. In order to cause the reaction to start the bath temperature is raised (see FIG. 2c). As soon as the internal temperature reaches −9° C. to −8° C. the polycondensation begins, the acid chloride dissolves instantaneously and the internal temperature rises to +35° C. within 90 seconds. The delayed temperature rise amounts thus, despite a higher bath temperature, only to 43° C. The viscosity of the reaction mixture increases rapidly. The cooling bath temperature is further raised to −5° C. and the condensation mixture stirred for a further 2 hours. Thereafter the flask is placed in an oil bath, heated to 80° C. and the hydrogen chloride neutralized by introduction of gaseous ammonia. The separation of the precipitated ammonium chloride takes place by pressure filtration at 70–80° C. The completely clear and almost colorless solution contains 16% by weight of poly-m-phenyleneisophthalamide. A small test portion is treated in the usual way for determination of the reduced specific viscosity. The RSV value amounts to 2.23.

The main part of the solution shows, after 12 weeks storage at room temperature, no sign of cloudiness.

EXAMPLE 4

In a 6 litre multi-necked flask provided with a stainless steel stirrer, thermometer and gas inlet tube, 259.2 g. (2.398 mol) of m-phenylene diamine are dissolved in 3000 g. of anhydrous N-methylcaprolactam at room temperature whilst introducing nitrogen and stirring. Thereafter the flask is lowered into a cooling bath whose temperature is controlled at −20° C. The water-clear solution is cooled whilst stirring to an internal temperature of −17.5° C. 487.0 g. (2.398 mol) of isophthalic acid dichloride in solid form are introduced and wetted with 260 g. of N-methylcaprolactam. The internal temperature rises on continued stirring to −12.5° C. because of the addition of the warmer starting material, but after 7 minutes it was −15° C. A large part of isophthalic acid dichloride remains undissolved at this temperature but is uniformly distributed in the reaction mixture by the stirring. To start the polycondensation the cooling bath temperature is raised within 11 minutes to −5° C. As soon as the internal temperature reaches −8° C., the exothermic reaction begins, the isophthalic acid dichloride dissolves spontaneously and the internal temperature rises to +35° C. in 2 minutes. The viscosity of the reaction mixture rapidly rises. After another 9 minutes the previously clear solution becomes cloudy owing to the separation of the hydrochloride of N-methylcaprolactam-formed. The highly viscous reaction mixture is further stirred for two hours with a bath temperature of −5° C.

For neutralization of the separated hydrochloride of N-methylcaprolactam the flask is introduced into an oil bath, and, whilst stirring, heated to 100° C. within about 20 minutes. At 40° C. internal temperature the solution becomes completely clear and the hydrochloride dissolves without residue. Then gaseous ammonia is introduced whereupon a white precipitate of ammonium chloride forms spontaneously. In about 2 hours the neutralization is complete and the reaction mixture weakly alkaline.

The highly viscous solution is freed from ammonium chloride by pressure filtration at 100–120° C. The filtered solution is almost colorless and completely clear. The solution contains 14.9% by weight of poly-m-phenyleneisophthalamide. The dynamic viscosity of the solution is 920 poises, measure at 20° C.

A small test portion is precipitated in the usual way with water and dried. The RSV amounts to 2.55.

The main quantity of the salt-free solution is directly used for spinning experiments.

EXAMPLE 5

For the polycondensation the apparatus described in Example 1 is used with an additional dropping funnel. 54.07 g. (0.50 mol) of m-phenylenediamine are placed in the flask and under a nitrogen atmosphere 400 g. of anhydrous N-methylcaprolactam is dissolved with slow stirring at room temperature. The flask is then lowered into a cooling bath controlled at −23° C. and the flask contents cooled to −15° C. internal temperature. The dropping funnel contains a solution of 101.515 g. (0.50 mol) of isophthalic acid dichloride in 227 g. of N-methylcaprolactam. The dissolved acid chloride is dropped during 5 minutes into the cooled diamine solution whilst stirring. The polycondensation starts at once but the heat development is rendered slow by the addition of the acid chloride. The maximum temperature of 37° C. is only reached 5 minutes after the addition has begun (see FIG. 3, curve A). The cooling bath temperature is raised to −5° C. and the highly viscous condensation mixture is stirred for a further 2 hours. The neutralization and pressure filtration of the solution takes place in the way described in Example 4.

The RSV of the poly-m-phenyleneisophthalamide obtained amounts to 1.1.

In another experiment the procedure was similar with the difference that the dissolved acid chloride was dropped in over a period of 10 minutes. The rise of the internal temperature was correspondingly protracted (see FIG. 3, curve B).

EXAMPLE 6

For a comparative solution experiment, a poly-m-phenyleneisophthalamide is used which had been made according to the known process of boundary surface polymerization in cyclohexanone/water. After washing and drying the polymer had a RSV of 1.67 (0.2% in concentrated sulphuric acid at 20° C.). 15 g. of the polymer is dissolved whilst stirring at 50–60° C. in 85 g. of N-methylcaprolactam. After 2–3 hours there is formed a colorless, clear, highly viscous solution which can be used for spinning fibres, for casting foils, and for impregnating and which, on standing for weeks at room temperature, undergoes no change.

In dimethylacetamide and N-methylpyrrolidone, from the same polyamide only 5% solutions can be made in accordance with U.S. Pat. No. 3,068,188 in the absence of inorganic salts, which solutions on account of their low viscosity and instability on storage, are unsuited for practical working processes.

EXAMPLE 7

According to Example 3, a salt-free 16% by weight solution of poly-m-phenyleneisophthalamide in N-methylcaprolactam is made. The polyamide has an RSV of 2.08.

The solution is spread on a glass plate with the aid of a doctor knife and the film obtained dried at 70° C. in vacuo (11 mm. Hg). After 2 hours the temperature is raised to 90° C. and finally the last traces of solvent removed at 120° C. in high vacuum (0.5 mm. Hg). A clear film of 28μ thickness is obtained on which the following mechanical and electrical properties are measured.

Tenacity, kp./cm.$^2$ ____________________________ 910
Extension, percent _____________________________ 4.5
Modulus of elasticity, kp./cm.$^2$ _______________ 31,000
Electrical breakdown resistance, kv./cm. _______ 2470

EXAMPLE 8

A salt-free 16% by weight solution is produced in accordance with Example 3 containing poly-m-phenyleneisophthalamide in N-methyl-caprolactam, having an RSV of 2.55. The solution, having a viscosity of 920 poises at 20° C. is forced with a feed rate of 3.6 ml. per minute through a nozzle with 100 holes whose circular bores have a diameter of 80μ, into a precipitating bath consisting of a 35% by weight aqueous calcium chloride solution. The filaments pass through the precipitation bath heated to 90–100° C. with an immersion length of 160 cm. and are drawn off by draw off rollers running with a circumferential speed of 11 m. per minute. Then the filaments pass through a clean water washing bath of 80 cm. length at 20° C. and are finally wound on a perforated spool with a circumferential speed of 22 m. per minute. In this bath there is thus stretching at a ratio of 2:1.

The spool is then washed by insertion into a water bath at 30–50° C. for 2 hours and then dried in vacuo (0.5 mm. Hg). The dried yarn is then stretched in a ratio of 2:1 in a hot stretch thread twisting machine (Rieter J5/10a) at 305° C. with a drafting speed of 25 m. per minute, in which the yarn receives 2700 turns per metre. A yarn with the following properties is obtained:

Total titre, den. ______________________________ 138
Individual filament titre, den. _______________ 1.38
Tearing tenacity, g./den. _____________________ 4.2
Extension at break, percent ___________________ 14.2
Initial modulus, g./den. ______________________ 106

EXAMPLE 9

For the polycondensation of poly-m-phenyleneisophthalamide the apparatus described in Example 1 is used. The same quantities of starting materials are used, as solvent however N-ethylcaprolactam is used.

The diamine solution produced is clear and stirrable at an internal temperature of −17° C. The cooling bath temperature at the time of addition of the solid isophthalic acid dichloride is −24° C. The acid chloride at first remains undissolved and is suspended in the reaction mixture by stirring. The polycondensation is started by raising the bath temperature to −5° C. The reaction begins at an internal temperature of −12° C. and proceeds more slowly than in N-methylcaprolactam. The maximum temperature of +35° C. is only reached 11 minutes from the beginning of the reaction. The further working up of the condensation product takes place in the way described in Example 3.

The RSV of the product obtained amounts to 1.58.

The filtered salt free solution is still completely clear after storing for 5 weeks.

EXAMPLE 10

The manufacture of poly-m-phenyleneisophthalamide takes place according to Example 9. As solvent 3,3,5-trimethyl-N-methylcaprolactam is used. The polycondensation reaction starts only at an internal temperature of −2° C. and then progresses rapidly. After 40 seconds the maximum temperature of 35° C. is reached. The temperature rise produced exothermically is small, however, and amounts only to 34° C. The working up of the condensation mixture takes place as in Example 3.

The RSV of the polymer obtained amounts to 2.15.

EXAMPLE 11

The procedure is as in Examples 1 and 9, with the difference that as solvent N-methyl-oenanthyl lactam is used. The polycondensation starts at 0° C., which is produced by raising the cooling bath temperature, originally −24° C. to +1° C. The maximum temperature of +41° C. is reached in 60 seconds. The viscosity of the reaction mixture increases very considerably; it remains, however, stirrable in all phases of the polycondensation.

The neutralization and pressure filtration take place as in Example 3. A salt-free polyamide solution is obtained which remains clear even after weeks.

The RSV of the polymer amounts to 1.85.

TABLE 1

Light Transmission of Poly-m-phenyleneisophthalamide in Different Solvents

[16 percent solution by weight, 20° C., 19 mm. layer thickness]

| Time, days: | Light transmission in percent of initial value | | |
|---|---|---|---|
| | N-methylcaprolactam | Dimethylacetamide | N-methylpyrrolidone |
| 1 | 100 | 96.7 | 90 |
| 2 | | 93.1 | 75 |
| 3 | 100 | 90.0 | 62.8 |
| 4 | | | 50.7 |
| 5 | 100 | 83.2 | |
| 6 | 100 | | 31.1 |
| 7 | | 76.0 | |
| 8 | 100 | | 2.4 |
| 9 | | | |
| 10 | | | |
| 12 | 100 | 61.6 | 0 |

What we claim is:

1. In a process for preparing stable solutions capable of being spun or cast into shaped articles such as fibers and films by conventional wet spinning techniques, the solution containing a linear aromatic polyamide at least 50% of which has repeating structural units of the Formula I:

(I)

the polyamide exhibiting a reduced specific viscosity of at least 1.0 based on a 0.2 gram solution of the polyamide in 100 milliliters of concentrated sulfuric acid at 20° C., the improvement which comprises dissolving the polyamide in a salt-free solvent of the Formula II:

(II)

in which R is an alkyl having 1 to 4 carbon atoms and $n$ is an integer from 5 to 7; to obtain a stable, salt-free solution.

2. The process as recited in claim 1, wherein hydrogen atoms of the methylene group are partly or completely replaced by alkyl groups having 1–4 carbon atoms.

3. The process as recited in claim 1 wherein the solvent is N-methylcaprolactam.

4. The process as recited in claim 1, wherein the solvent is N-ethyl-3,3,5-trimethylcaprolactam.

5. The process as recited in claim 1, wherein the improvement is further characterized in that the solution is made by polycondensation of a corresponding diamine with a corresponding acid chloride in the solvent, whereby a polyamide is formed, without isolation of the polyamide formed.

6. The process as recited in claim 5, wherein the polycondensation is carried out at −15 to 50° C.

7. The process as recited in claim 5, wherein the polycondensation takes place by combining separate solutions of the diamine and acid chloride.

8. A stable, salt-free, neutral solution capable of being spun or cast into shaped articles such as fibers and films by conventional wet spinning techniques which comprises a linear aromatic polyamide at least 50% of which has repeating structural units of the Formula I:

(I)

the polyamide exhibiting a reduced specific viscosity of at least 1.0, based on a 0.2 gram solution of the polyamide in 100 milliliters of concentrated sulfuric acid at 20° C., and a salt-free solvent of the Formula II:

(II)

in which R is an alkyl group having 1 to 4 carbon atoms and $n$ is an integer from 5 to 7.

9. The solution as claimed in claim 8, wherein at least one hydrogen atom of the methylene group in the Formula II is substituted by alkyl having 1 to 4 carbon atoms.

10. The solution as claimed in claim 8, wherein the lactam is N-methyl caprolactam.

11. The solution as claimed in claim 8, wherein the lactam is N-ethyl-3,3,5-trimethyl caprolactam.

12. The solution as claimed in claim 8, wherein the polyamide is a polycondensate of m-phenyl diamine and isophthaloyl chloride, the polycondensation being carried out in said lactam.

13. The solution as claimed in claim 12, wherein said polycondensation is carried out in the range of about −15° C. to 50° C.

References Cited
UNITED STATES PATENTS

| | | | |
|---|---|---|---|
| 3,600,350 | 8/1971 | Kwolek | 260—32.6 |
| 3,472,819 | 10/1969 | Stephens | 260—78 |
| 3,671,542 | 6/1972 | Kwolek | 260—30.8 R |
| 3,063,966 | 11/1962 | Kwolek | 260—78 |

ALLAN LIEBERMAN, Primary Examiner
R. ZAITLEN, Assistant Examiner

U.S. Cl. X.R.
260—32.6 NA